(12) United States Patent
Gaile

(10) Patent No.: US 11,603,079 B2
(45) Date of Patent: Mar. 14, 2023

(54) DYNAMIC NO-BACK BRAKE HAVING A DAMPING ELEMENT

(71) Applicant: Liebherr-Aerospace Lindenberg GmbH, Lindenberg/Allgäu (DE)

(72) Inventor: Anton Gaile, Leutkirch (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 342 days.

(21) Appl. No.: 16/770,233

(22) PCT Filed: Dec. 7, 2018

(86) PCT No.: PCT/EP2018/083936
§ 371 (c)(1),
(2) Date: Jun. 5, 2020

(87) PCT Pub. No.: WO2019/110782
PCT Pub. Date: Jun. 13, 2019

(65) Prior Publication Data
US 2020/0377063 A1 Dec. 3, 2020

(30) Foreign Application Priority Data
Dec. 8, 2017 (DE) ...................... 10 2017 129 235.7

(51) Int. Cl.
*F16D 55/36* (2006.01)
*B60T 7/12* (2006.01)
*B60T 1/06* (2006.01)
B64C 13/28 (2006.01)
B64D 45/00 (2006.01)
F16D 125/36 (2012.01)

(52) U.S. Cl.
CPC ................ *B60T 7/12* (2013.01); *B60T 1/062* (2013.01); *B64C 13/28* (2013.01); *B64D 2045/001* (2013.01); *F16D 2125/36* (2013.01)

(58) Field of Classification Search
CPC ......... B64C 13/28; B64C 13/32; F16D 67/02; F16D 2125/36; F16H 2035/005; F16H 25/2454; B60T 7/122
See application file for complete search history.

(56) References Cited

U.S. PATENT DOCUMENTS

| 4,169,523 | A | | 10/1979 | Klimkowski et al. |
| 4,176,733 | A | * | 12/1979 | Twickler ................. F16D 59/02 188/134 |
| 4,483,429 | A | | 11/1984 | Tiedeman |
| 4,597,477 | A | * | 7/1986 | Miller ..................... F16D 59/00 188/134 |
| 5,199,538 | A | | 4/1993 | Fischer et al. |

(Continued)

FOREIGN PATENT DOCUMENTS

| DE | 698 19 807 T2 | 9/2004 |
| DE | 10 2013 105 642 A1 | 12/2014 |

(Continued)

*Primary Examiner* — Nicholas J Lane
(74) *Attorney, Agent, or Firm* — Dilworth & Barrese, LLP

(57) ABSTRACT

The invention relates to a mechanical non-return mechanism for an aircraft application, wherein the aircraft application can be part of a flight control. The non-return mechanism comprises at least one drag brake, at least one main brake, and at least one ball ramp mechanism.

9 Claims, 2 Drawing Sheets

(56) References Cited

U.S. PATENT DOCUMENTS

| | | | |
|---|---|---|---|
| 6,231,012 B1* | 5/2001 | Cacciola | F16D 9/08 244/231 |
| 2006/0163026 A1* | 7/2006 | Lang | F16D 67/00 192/223 |
| 2008/0185242 A1* | 8/2008 | Mayer | F16D 67/00 188/181 T |
| 2017/0261048 A1* | 9/2017 | Bae | F16D 15/00 |
| 2018/0106353 A1* | 4/2018 | Guarino | B60K 23/04 |
| 2020/0189723 A1* | 6/2020 | Bae | B64C 13/32 |
| 2020/0324872 A1* | 10/2020 | Trenkle | B64C 3/38 |

FOREIGN PATENT DOCUMENTS

| | | |
|---|---|---|
| EP | 0 243 050 A2 | 10/1987 |
| EP | 2 824 353 A2 | 1/2015 |
| FR | 2 424 445 A1 | 11/1979 |

* cited by examiner

DYNAMIC NO-BACK BRAKE HAVING A DAMPING ELEMENT

BACKGROUND OF THE INVENTION

The invention relates to a mechanical non-return mechanism for an aircraft application, wherein the aircraft application can be part of a flight control. The non-return mechanism comprises at least one drag brake, at least one main brake, and at least one ball ramp mechanism.

Non-return mechanisms or no-back brakes of the category are known from the prior art and serve to decouple a consumer or an actuator of an aircraft from a drive or from a source of energy. This can in particular be necessary on an overload event or in the case of damage to the respective apparatus.

It is known to couple aircraft applications such as primary or secondary controls of the aircraft to a drive via a corresponding non-return mechanism. If damage occurs to the drive or if a drive shaft between the drive and the output is destroyed in aircraft operation, the non-return mechanism ensures that the output side of the aircraft application is restrained and can thus not influence the flight behavior of the aircraft.

There is a problem with such no-back brakes that they are susceptible to vibrations or so-called chatter. This in particular applies when a consequential load occurs.

SUMMARY OF THE INVENTION

Against this background, it is the object of the invention to provide an improved non-return mechanism in which in particular the tendency to said vibrations is reduced.

This object is achieved in accordance with the invention by a mechanical non-return mechanism having the features herein. Advantageous embodiments are also the subject herein.

The mechanical non-return mechanism is in particular provided for aircraft applications that can be part of a flight control. The flight control can be a primary and/or a secondary flight control and can comprise flaps or other adjustable control surfaces that can change the flight behavior of the aircraft.

The non-return mechanism comprises at least one drag brake, at least one main brake, and at least one ball ramp mechanism. The two brakes and the ball ramp mechanism can be coaxially supported and/or axially spaced apart from one another. Provision is made in accordance with the invention that the main brake and the drag brake are coupled to one another by means of at least one friction washer. The friction washer and/or another damping element can in particular greatly reduce the vibration between the two brakes.

It is conceivable in a preferred embodiment of the invention that the main brake and the drag brake are spaced apart from one another in the axial direction of the non-return mechanism.

It is conceivable in a further embodiment that the friction washer is arranged between the main brake and the drag brake and/or between two parts of the ball ramp mechanism in the axial direction of the non-return mechanism. The term of a friction washer is thus to be broadly understood and the friction washer can be configured in multiple parts or can comprise a plurality of separate parts wherein the individual parts can be spaced apart from one another and/or can be arranged separated from one another by other components.

The damping of the two brakes can thus take place directly by a friction washer arranged therebetween and/or indirectly by a friction washer arranged between two parts of the ball ramp mechanism. The two parts of the ball ramp mechanism can be the two components which have ramps and are axially spaced apart from one another or are opposite one another and between which the balls of the ball ramp mechanism are positioned.

It is conceivable in a further preferred embodiment of the invention that the drag brake is arranged between the friction washer and the ball ramp mechanism in the axial direction of the non-return mechanism.

Provision is preferably made that the friction washer is radially supported on the shaft.

It is conceivable in a further preferred embodiment of the invention that the friction washer comprises a radially outer region that is configured as hollow cylindrical and that extends further in the axial direction than a radially inner region of the friction washer. The radially outer region of the friction washer can be configured in a particularly preferred embodiment to be in contact with the main brake and with the drag brake. The contact here can be permanent or can be instigated by a shape match or by material continuity or can be caused by force transmission that receives the force required for this by a spring device, for example.

It is conceivable in a further preferred embodiment of the invention that the radially outer region of the friction washer has the same radial position as the balls of the ball ramp mechanism and/or the contact regions of the drag brake and/or of the main brake.

A force flow can be ensured by these components that is as uniform as possible in the axial direction of the apparatus due to this same radial positioning of said components. The force flow can in particular be directed in parallel with the axis of the non-return mechanism. The contact regions of the brakes in the present case designate those regions in which, for example, brake disks having brake shoes or other components of the brakes acting on one another are in contact with one another to exert a braking force.

It is conceivable in a further preferred embodiment of the invention that the drag brake is coupled via a toothed arrangement to one part of the ball ramp mechanism and the main brake is coupled to another part of the ball ramp mechanism. The two parts of the ball ramp mechanism can be the parts of the ramp mechanism that can be coupled by means of the balls of the ball ramp mechanism and are axially spaced apart from one another. The friction washer can thus be an indirect connection of the two parts of the ball ramp mechanism, wherein the two parts of the ball ramp mechanism are indirectly coupled to the friction washer via the main brake and the drag brake.

It is conceivable in a further preferred embodiment of the invention that the friction washer comprises a friction lining applied thereto. In a further preferred embodiment, the friction washer can be produced from bronze.

The non-return mechanism can have means by which it is achieved that the friction is proportional to the applied torque.

The non-return mechanism can have means by which it is achieved that the friction between the ball ramp parts of the ball ramp mechanism is applied as a constant friction.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

BRIEF DESCRIPTION OF THE DRAWINGS

Further advantages and details of the invention are explained with reference to the embodiments shown by way of example in the Figures. There are shown.

DESCRIPTION OF THE PREFERRED EMBODIMENTS

Figure 1:
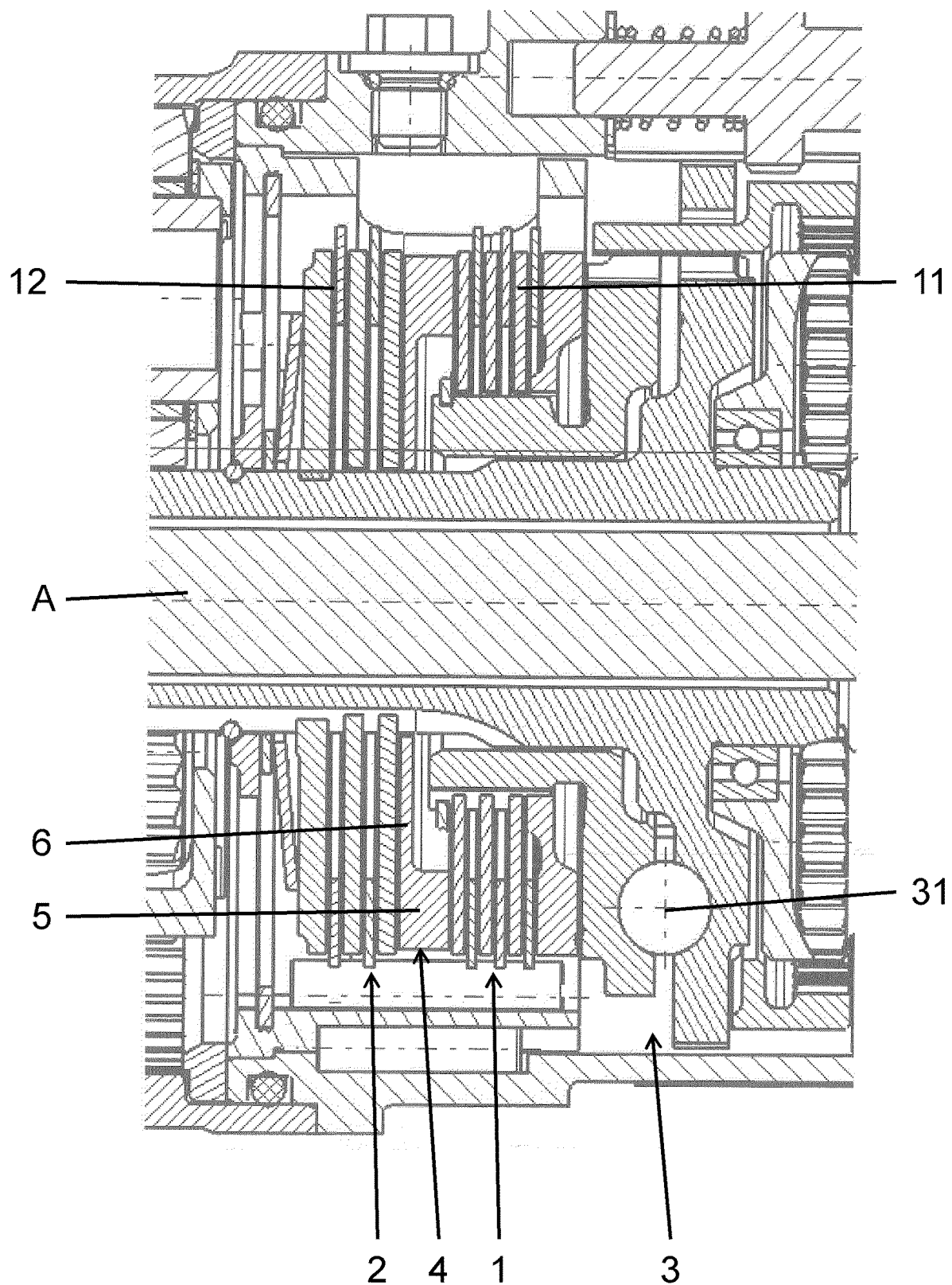
FIG. 1: a cross-sectional view of a non-return mechanism in accordance with the invention.

FIG. 1 shows a sectional view of a non-return mechanism in accordance with the invention for an aircraft application. The aircraft application can, for example, be a flight control such as a primary or secondary flight control of an aircraft. The aircraft application can also be understood as a part or as a subcomponent of a corresponding flight control.

The non-return mechanism comprises at least one drag brake 1, at least one main brake 2, and at least one ball ramp mechanism 3. Provision is made in accordance with the invention that the main brake 2 and the drag brake 1 are coupled to one another by means of at least one friction washer 4. The friction washer 4 can act as a damper or be configured as a damper.

The non-return mechanism in accordance with the invention is a mechanical non-return mechanism for rotational movements. Non-return mechanisms of the category are configured also to work dynamically.

This means that the non-return mechanism can also brake off the complete energy that is supplied from the output side of the non-return mechanism or can convert it into heat while rotating or during a transmitted rotational movement.

With such a dynamic operating case of the no-back brake, chatter of the non-return mechanism frequently occurs in the embodiments known from the prior art, said chatter making itself noticeable, on the one hand, by a loud noise, the chatter, and, on the other hand, in the form of torque peaks in the system.

Non-return mechanisms of the category are used in a plurality of aircraft or airplanes to keep one or more units or outputs or consumers in their then current positions and thus to stabilize the flight behavior of the aircraft in the case of a fault such as after a breakage of a shaft system coupled to the non-return mechanism or after the failure of a drive system coupled to the non-return mechanism. Systems of the category are used, for example, in landing flap drives or trim actuators.

Figure 2:
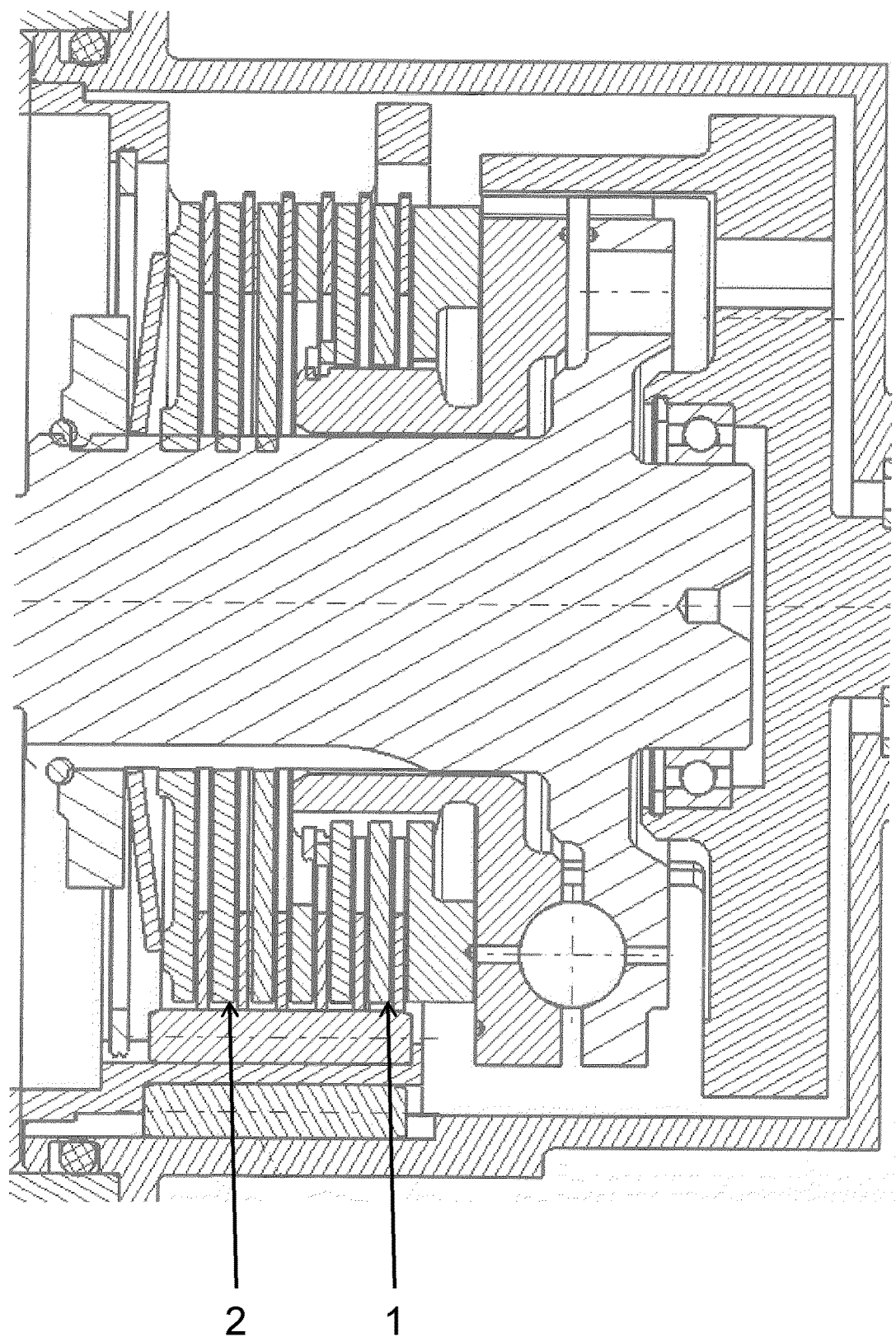
FIG. 2: a cross-sectional view of a non-return mechanism known from the prior art.

The friction washer 4 provided in accordance with the invention represents a friction coupling between the main brake 2 and the drag brake 1. In accordance with the prior art shown in FIG. 2, a stator disk that is not adapted to effectively damp the oscillation behavior between the two brakes 1, 2 is introduced between the drag brake 1 and the main brake 2.

In contrast, the non-return mechanism in accordance with the invention has a friction washer 4 or damper 4 that is provided between the brakes 1, 2 and that reduces vibrations between the brakes 1, 2 by its damping behavior.

The two brakes 1, 2 can here be spaced apart from one another in the axial direction and the friction washer 4 can be arranged in an axial direction between the two brakes 1, 2. The axial direction corresponds to the axis of the non-return mechanism marked by the reference symbol A. The friction washer 4 can be arranged between two parts of the ball ramp mechanism 3 instead of between the two brakes 1, 2. This is not shown in any more detail in the Figures.

In the embodiment of the invention shown in FIG. 1, the drag brake 1 is arranged between the friction washer 4 and the ball ramp mechanism 3 in the axial direction of the non-return mechanism.

The friction washer 4 comprises a radially outer region 5 that is configured as hollow cylindrical and that extends further in the axial direction than a radially inner region 6 of the friction washer. The radially outer region 5 of the friction washer 4 is configured to be in contact with the main brake 2 and with the drag brake 1. Forces can be transmitted between the two brakes 1, 2 over the axially outer region 5. The radially outer region 5 of the friction washer 4 can, as can be seen from FIG. 1, have the same radial position or the same distance from the axis of rotation of the non-return mechanism as the balls 31 of the ball ramp mechanism 3 and/or the contact regions 11, 12 of the drag brake 1 and the main brake 2. A force transmission is hereby made possible between said components that is as straight-line as possible.

The drag brake 1 can be coupled to one part of the ball ramp mechanism 3 and the main brake 2 can be coupled to another part of the ball ramp mechanism 3 via a toothed arrangement.

The friction washer 4 can comprise a friction lining attached thereto and not shown in the Figures. The friction washer 4 can be produced from bronze, for example.

The non-return mechanism can comprise a self-reinforcing disk brake in which parts of the ball ramp mechanism 3 are used to convert a torque provided by the output side into a braking force. The non-return mechanism directs loads introduced from the output side and also in particular supporting operating loads away into the housing of the non-return mechanism.

The non-return mechanism comprises two brake sections. The first section comprises the drag brake 1 that provides a self-reinforcing friction toque during all the normal operating conditions of the non-return mechanism. The second section comprises the main brake 2 and acts in the presence of a torque provided from the output side or of a load or during operation with supporting loads or torques that are directed in the same direction as the drive torque transmitted via the non-return mechanism. The friction washer 4 between the two brakes 1, 2 counteracts the chattering of the total non-return mechanism.

In normal operation of the non-return mechanism and with counteracting output torques, provision can be made that a driver drives both parts of the ball ramp mechanism, that is, a ball ramp disk and a reaction disk, together. The balls of the ball ramp mechanism remain within their cut-outs and the main brake does not brake. The drag brake remains in its engagement position by compression springs, not shown, in order thus to provide a small braking effect.

In a further position, the drive torque and the torques introduced from the output side act in the same direction.

In a normal operating situation with supporting torques of the output side, the driver only acts on the reaction disk. The balls roll up the ramps of the ball ramp mechanism, with the distance rolled up being proportional to the amount of the supporting torque and with the brake hereby being actuated. The torque provided by the PDU unblocks the brake in that it provides a torque difference that corresponds to the difference between the torque generated by the brake and the torque generated by the output side.

A state is furthermore possible in which the non-return mechanism is separate from a drive.

In a corresponding separated state, the balls roll over the ramps proportionally to the amount of the output torque and actuate the brake to direct the load into the structure or into the housing of the non-return mechanism. During a normal flight situation in which landing flaps or other output elements are not moved, the non-return mechanism holds these output elements in their positions in the same manner.

In accordance with the invention, it is possible to damp the relative movements between the two brake disk packages of the brakes 1, 2. Since the drag brake 1 is connected via a toothed arrangement to one side of the ball ramp 3 and the main brake 2 is connected to the second side of the ball ramp 3, the movement of the ball ramp parts toward one another is also effectively damped by this coupling. This in turn produces a suppression of the chattering since the ball ramp parts vibrate against one another during chatter or the chattering is a consequence of the relative movement between the two ball ramp parts.

Differing from the design shown, the friction coupling can also take place directly between the ball ramp parts; it can optionally be proportional to the applied load as shown in the Figures or can be integrated as fixed friction between the two components.

It is possible in accordance with the invention to couple ball ramp parts of the ball ramp mechanism 3 to one another via friction. It is possible here that the friction increases proportionally to the applied torque. It is also conceivable that the friction between the ball ramp parts is applied as a constant friction. It is conceivable in an embodiment that is likewise not shown that the friction coupling between the drag brake and the main brake takes place by means of friction disks with or without friction lining.

The invention claimed is:

1. A mechanical non-return mechanism for an aircraft application as part of a flight control, comprising
   at least one drag brake,
   at least one main brake,
   at least one ball ramp mechanism, and
   at least one separate friction washer, wherein
   the main brake and the drag brake are spaced apart from one another and coupled to one another by said at least one separate friction washer,
   the friction washer is arranged in an axial direction between the main brake and the drag brake, and
   radial outer (5) and inner (6) regions of the friction washer (4) have different axial thicknesses.

2. A mechanical non-return mechanism in accordance with claim 1, wherein the drag brake is arranged between the friction washer and the ball ramp mechanism in an axial direction of the non-return mechanism.

3. A mechanical non-return mechanism in accordance with claim 1, wherein the friction washer comprises a region configured as hollow cylindrical and supported on a shaft in the radial direction.

4. A mechanical non-return mechanism in accordance with claim 1, wherein a radially outer region of the friction washer is configured to be in contact with the main brake and the drag brake.

5. A mechanical non-return mechanism in accordance with claim 1, wherein a radially outer region of the friction washer has a same radial position as balls of the ball ramp mechanism and/or contact regions of the drag brake and/or of the main brake.

6. A mechanical non-return mechanism in accordance with claim 1, wherein the drag brake is coupled to a part of the ball ramp mechanism via a toothed arrangement and the main brake is coupled to another part of the ball ramp mechanism.

7. A mechanical non-return mechanism in accordance with claim 1, wherein the friction washer is produced from bronze.

8. A mechanical non-return mechanism in accordance with claim 1, wherein the non-return mechanism is configured such that friction is proportional to applied torque.

9. A mechanical non-return mechanism in accordance with claim 1, wherein the non-return mechanism is configured to apply constant friction between ball ramp parts.

* * * * *